United States Patent
Mallick et al.

(10) Patent No.: US 10,817,181 B2
(45) Date of Patent: Oct. 27, 2020

(54) HOST DEVICE WITH MULTI-PATH SCHEDULING BASED AT LEAST IN PART ON MEASURED PARAMETERS

(71) Applicant: EMC IP Holding Company LLC, Hopkinton, MA (US)

(72) Inventors: Sanjib Mallick, Bangalore (IN); Vinay G. Rao, Bangalore (IN); Subin George, Framingham, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 16/231,694

(22) Filed: Dec. 24, 2018

(65) Prior Publication Data

US 2020/0204475 A1 Jun. 25, 2020

(51) Int. Cl.
*G06F 3/06* (2006.01)
*H04L 12/727* (2013.01)
(Continued)

(52) U.S. Cl.
CPC ............ *G06F 3/0611* (2013.01); *G06F 3/065* (2013.01); *G06F 3/067* (2013.01); *G06F 3/0689* (2013.01);
(Continued)

(58) Field of Classification Search
CPC ...... G06F 3/0689; G06F 3/0611; G06F 3/067; G06F 3/065; G06F 11/1076; H04L 41/22; H04L 41/06; H04L 41/20
See application file for complete search history.

(56) References Cited

U.S. PATENT DOCUMENTS 6,687,746 B1   2/2004   Shuster et al.
6,697,875 B1   2/2004   Wilson
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Kyung H Shin
(74) *Attorney, Agent, or Firm* — Ryan, Mason & Lewis, LLP

(57) ABSTRACT

An apparatus comprises a host device configured to communicate over a network with a storage system comprising a plurality of storage devices. The host device comprises a multi-path input-output driver configured to schedule input-output operations for delivery to the storage system over the network. The multi-path input-output driver is further configured to measure latencies of respective ones of a plurality of paths from the host device to the storage system, to schedule particular ones of the input-output operations for delivery to the storage system over particular ones of the paths based at least in part on the measured latencies, and to control transmission of the particular input-output operations over the particular paths in accordance with the scheduling. The scheduling additionally or alternatively takes into account other measured parameters such as measured latencies of respective ones of a plurality of storage volumes of the storage system and/or measured payload size per operation metrics for each of at least a subset of the plurality of paths.

20 Claims, 2 Drawing Sheets

(51) Int. Cl.
 H04L 12/707 (2013.01)
 H04L 29/08 (2006.01)
 H04L 12/931 (2013.01)
 H04L 12/26 (2006.01)
 H04L 12/875 (2013.01)
 H04L 12/24 (2006.01)

(52) U.S. Cl.
 CPC .............. *H04L 41/06* (2013.01); *H04L 41/20* (2013.01); *H04L 41/22* (2013.01); *H04L 43/0852* (2013.01); *H04L 45/121* (2013.01); *H04L 45/24* (2013.01); *H04L 47/56* (2013.01); *H04L 49/356* (2013.01); *H04L 67/1097* (2013.01)

(56) References Cited

U.S. PATENT DOCUMENTS

| | | | |
|---|---|---|---|
| 7,454,437 | B1 | 11/2008 | Lavallee et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,904,681 | B1 | 3/2011 | Bappe et al. |
| 7,925,872 | B2 | 4/2011 | Lai et al. |
| 8,959,249 | B1* | 2/2015 | Love ..................... G06F 3/0611 710/6 |
| 9,400,611 | B1 | 7/2016 | Raizen |
| 9,594,780 | B1 | 3/2017 | Esposito et al. |
| 9,778,852 | B1 | 10/2017 | Marshak et al. |
| 2003/0179227 | A1* | 9/2003 | Ahmad .................. H04L 41/06 715/736 |
| 2004/0010563 | A1 | 1/2004 | Forte et al. |
| 2004/0057389 | A1* | 3/2004 | Klotz ..................... H04L 41/22 370/252 |
| 2006/0129876 | A1* | 6/2006 | Uemura .............. G06F 11/1076 714/6.12 |
| 2008/0043973 | A1 | 2/2008 | Lai et al. |
| 2008/0244174 | A1* | 10/2008 | Abouelwafa ........... G06F 3/065 711/114 |
| 2011/0197027 | A1 | 8/2011 | Balasubramanian et al. |
| 2016/0117113 | A1 | 4/2016 | Li et al. |

OTHER PUBLICATIONS

NVM Express, "NVM Express, Revision 1.3," NVM Express, May 1, 2017, 282 pages.
VMware, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
U.S. Appl. No. 15/849,828 filed in the name of Sanjib Mallick et al. filed Dec. 21, 2017 and entitled "Storage System with Input-Output Performance Control Utilizing Application Process Detection."

* cited by examiner

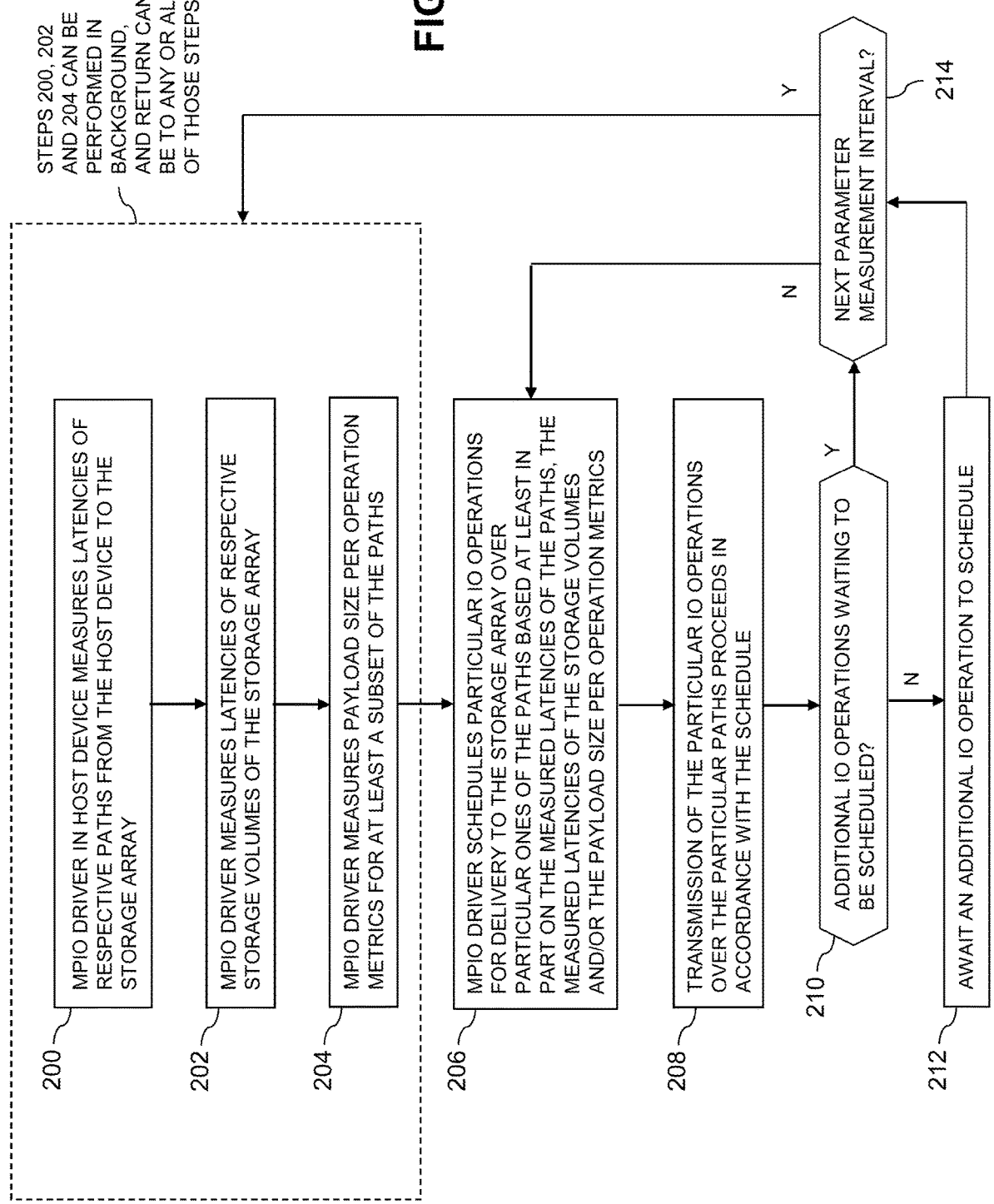

HOST DEVICE WITH MULTI-PATH SCHEDULING BASED AT LEAST IN PART ON MEASURED PARAMETERS

FIELD

The field relates generally to information processing systems, and more particularly to storage in information processing systems.

BACKGROUND

Storage arrays and other types of storage systems are often shared by multiple host devices over a network. However, problems can arise in such arrangements when paths from one or more of the host devices to the storage system experience performance degradations. For example, such degradations can arise when paths are added or deleted as a result of zoning and masking changes or other types of storage system reconfigurations performed by a storage administrator or other user. Also, as the number of host devices and the complexity of the shared storage system increases, the number of paths between the host devices and the storage system increases, making it even more difficult to detect performance issues that may be attributable to particular paths. Performance issues that are particularly difficult to detect under conventional practice include "slow drain" issues potentially arising from imbalances in supported data rates between host devices, network switches and storage arrays. Hardware problems and noisy communication lines can also lead to path performance issues that are very difficult to detect. Conventional approaches therefore often fail to take these and other performance issues into account in scheduling over multiple paths. Other types of behavioral characteristics of multiple paths are similarly neglected in the scheduling process.

SUMMARY

Illustrative embodiments configure a multi-path layer of one or more host devices to include functionality for scheduling based at least in part on measured parameters such as measured path latencies, measured storage volume latencies and/or measured payload size per operation metrics, in conjunction with communication with a storage array or other type of storage system via a storage area network (SAN) or other type of network. The multi-path layer illustratively comprises at least one multi-path input-output (MPIO) driver configured to process input-output (TO) operations of at least one host device. The multi-path layer in such arrangements can be configured to measure the parameters and to schedule IO operations based at least in part on the measured parameters.

Such embodiments advantageously provide improved performance by scheduling IO operations for delivery in a manner that takes into account the above-noted difficult-to-detect performance issues and other actual measured behavioral characteristics of the paths, storage volumes and IO operations.

In one embodiment, an apparatus comprises a host device configured to communicate over a network with a storage system comprising a plurality of storage devices. The host device comprises an MPIO driver configured to schedule IO operations for delivery to the storage system over the network. The MPIO driver is further configured to measure latencies of respective ones of a plurality of paths from the host device to the storage system, to schedule particular ones of the IO operations for delivery to the storage system over particular ones of the paths based at least in part on the measured latencies, and to control transmission of the particular IO operations over the particular paths in accordance with the scheduling.

The scheduling additionally or alternatively takes into account other measured parameters such as measured latencies of respective ones of a plurality of storage volumes of the storage system and/or measured payload size per operation metrics for each of at least a subset of the plurality of paths.

The plurality of paths illustratively comprise paths associated with respective initiator-target pairs, with each of the initiators comprising a corresponding host bus adaptor (HBA) of the host device and each of the targets comprising a corresponding port of at least one storage array of the storage system.

In some embodiments, the MPIO driver is configured to send a predetermined command to the storage system over each of the plurality of paths from the host device to the storage system, to monitor a response time for the predetermined command on each of the paths, and to determine the latencies of the respective paths based at least in part on the monitored response times. The predetermined command illustratively comprises a particular type of command selected to elicit a substantially immediate response from the storage system such that the monitored response time is primarily comprised of path delay rather than storage system delay, and may comprise a vendor unique command in an otherwise standardized command format. For example, the predetermined command may comprise a command to access a particular storage volume that is known by the host device not to exist within the storage system.

The MPIO driver in some embodiments is further configured to measure latencies of respective ones of a plurality of storage volumes of the storage system, and to schedule particular ones of the IO operations that are directed to one or more storage volumes having relatively high latencies for delivery to the storage system over particular ones of the paths also having relatively high latencies. The one or more storage volumes having relatively high latencies illustratively comprise one or more storage volumes that are subject to a synchronous replication process or other delay-inducing factors.

The MPIO driver in some embodiments is further configured to measure payload size per operation metrics for each of at least a subset of the plurality of paths, and to schedule particular ones of the IO operations for delivery to the storage system over particular ones of the paths based at least in part on the measured payload size per operation metrics. In such an embodiment, paths having relatively high payload size per operation metrics are given priority in the scheduling over paths having relatively low payload size per operation metrics. Such arrangements recognize that commands with higher payload sizes are more efficiently executed than commands with smaller payload sizes. More particularly, for a given total payload size, a smaller number of commands with larger payload sizes is generally executed more efficiently than a larger number of commands with smaller payload sizes, in that the same payload throughput is achieved with less command overhead.

A given one of the payload size per operation metrics is illustratively computed as a function of a number of IO operations previously scheduled for the path and a number of blocks corresponding to the previously-scheduled IO operations, with the numbers being determined from respective first and second counters implemented in the MPIO driver.

As a more particular example, the given payload size per operation metric comprises an average payload size per operation for the path computed as the number of blocks divided by the number of previously-scheduled IO operations.

These and other illustrative embodiments include, without limitation, apparatus, systems, methods and computer program products comprising processor-readable storage media.

BRIEF DESCRIPTION OF THE DRAWINGS

FIG. 2 is a flow diagram of a process for scheduling IO operations based at least in part on measured latencies and/or other measured parameters in a multi-path layer of a host device in an illustrative embodiment.

DETAILED DESCRIPTION

Figure 1:
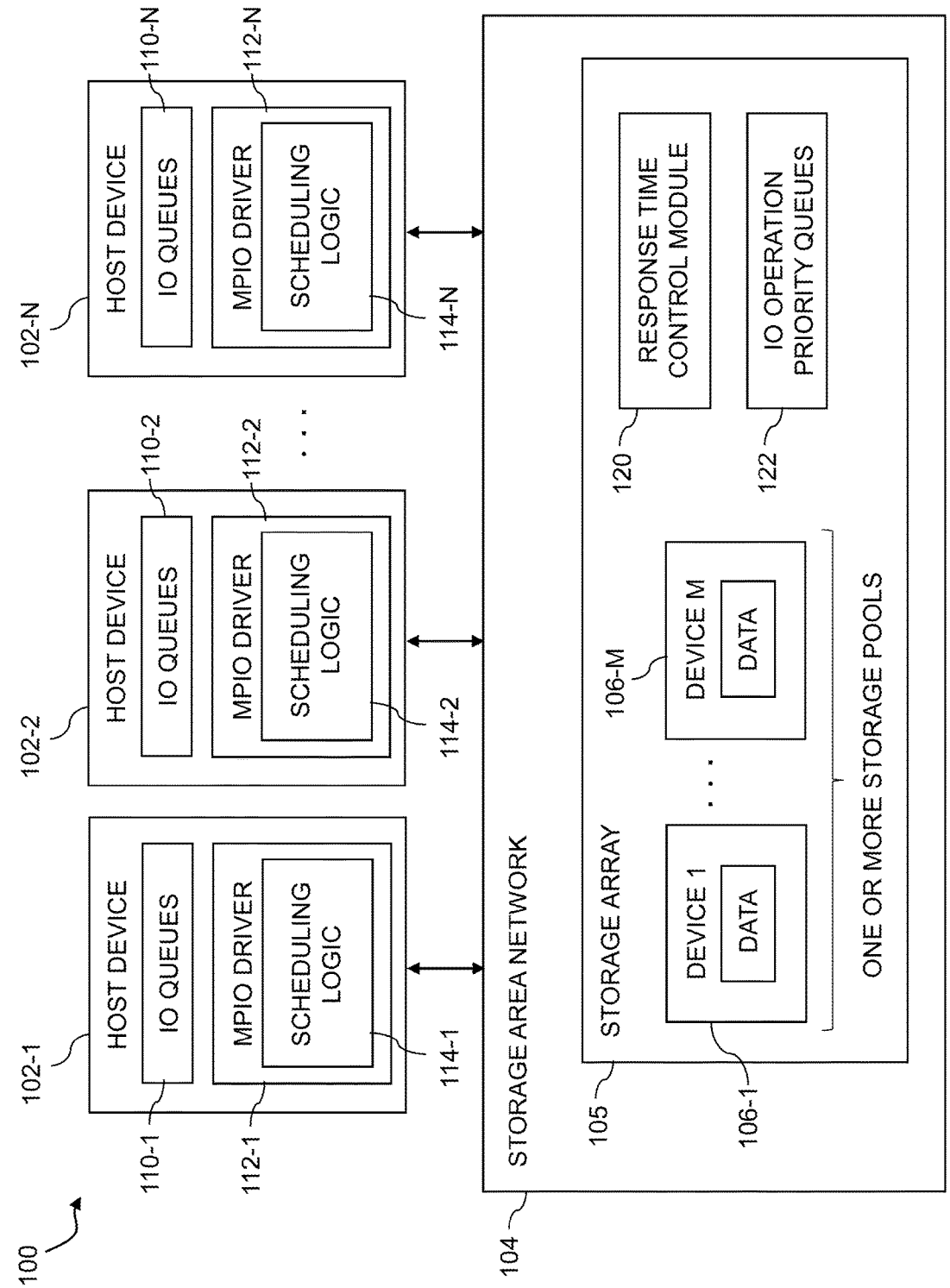
FIG. 1 is a block diagram of an information processing system configured with functionality for scheduling IO operations based at least in part on measured latencies and/or other measured parameters in a multi-path layer of a host device in an illustrative embodiment.

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. As will be described in more detail below, the multi-path layer provides functionality for scheduling based at least in part on measured parameters, using respective instances of scheduling logic 114-1, 114-2, . . . 114-N implemented within the MPIO drivers 112.

The MPIO drivers 112 may comprise, for example, otherwise conventional MPIO drivers, such as PowerPath® drivers from Dell EMC, suitably modified in the manner disclosed herein to perform scheduling based at least in part on measured parameters. Other types of MPIO drivers from other driver vendors may be suitably modified to incorporate functionality for scheduling based at least in part on measured parameters as disclosed herein.

The MPIO driver 112-1 is configured to select IO operations from its corresponding set of IO queues 110-1 for delivery to the storage array 105 over the SAN 104. Such selection forms at least part of what is also referred to herein as "scheduling" of IO operations for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO driver 112-1 implements at least one algorithm for scheduling the IO operations for delivery to the storage array 105 over the SAN 104. Such an algorithm is in some embodiments herein more particularly referred to as a "scheduling algorithm," but may additionally incorporate other types of selection functionality, such as load balancing functionality. A given "algorithm" utilized in selection of IO operations can therefore combine aspects of scheduling based at least in part on measured parameters with other selection considerations such as load balancing considerations.

The MPIO driver 112-1 is further configured to measure latencies of respective ones of a plurality of paths from the host device 102-1 to the storage array 105, to schedule particular ones of the IO operations for delivery to the storage array 105 over particular ones of the paths based at least in part on the measured latencies, and to control transmission of the particular IO operations over the particular paths in accordance with the scheduling.

A more detailed example of an arrangement of this type is described below in conjunction with the embodiment of FIG. 2.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

As a more specific illustration, in the case of Fibre Channel the achievable link speed may be about 90-95% of the negotiated link speed. A link with a negotiated link speed of 100 MByte/sec may therefore have an actual throughput of only 90 Mbyte/sec.

Various scheduling algorithms, load balancing algorithms and/or other types of algorithms can be utilized by the MPIO driver 112-1 in selecting IO operations from the IO queues 110-1 for delivery to the storage array 105 over the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

The amount of payload associated with in-process commands issued on a particular path is an example of what is also referred to herein as "outstanding command payload" for that path. An in-process command is illustratively a command that has been sent by the host device 102-1 to the storage array 105 but has not yet completed from the viewpoint of the host device 102-1.

In some embodiments, the MPIO driver 112-1 measures the latencies of the respective paths from the host device 102-1 to the storage array 105 at least in part by sending a predetermined command to the storage array 105 over each of the paths, monitoring a response time for the predetermined command on each of the paths, and determining the latencies of the respective paths based at least in part on the monitored response times. The latencies are illustratively round trip latencies of the respective paths.

The predetermined command is illustratively a particular type of command selected to elicit a substantially immediate response from the storage array 105, such that the monitored response time is primarily comprised of path delay rather than delay within the storage array 105. Such a command illustratively comprises a "vendor unique command" or VU command in an otherwise standardized command format, such as a SCSI command format. For example, the predetermined command in some embodiments comprises a command that attempts to access a particular storage volume that is known by the host device 102-1 not to exist within the storage array 105. A command of this type in some cases is not even queued within the storage array 105 but instead generally elicits a substantially immediate response from the storage array 105 back to the host device 102-1.

Additionally or alternatively, the MPIO driver 112-1 is configured to measure other parameters, such as latencies of respective storage volumes of the storage array 105 and/or payload size per operation metrics of the respective paths, and to utilize those measured parameters in the scheduling algorithm.

In some embodiments the MPIO driver 112-1 is further configured to measure latencies of respective ones of a plurality of storage volumes of the storage array, and to schedule particular ones of the IO operations that are directed to one or more storage volumes having relatively high latencies for delivery to the storage array 105 over particular ones of the paths also having relatively high latencies. The one or more storage volumes having relatively high latencies illustratively comprise one or more storage volumes that are subject to at least one of a synchronous replication process, a snapshot generation process, a storage volume reconstruction process or other type of process that tends to introduce delays in the processing of commands in the storage array 105. Other factors that can impact command processing latency and associated measured latencies for storage volumes in the storage array 105 include, for example, port load, CPU utilization and backend storage performance.

In these or other embodiments, the MPIO driver 112-1 is further configured to measure payload size per operation metrics for each of at least a subset of the plurality of paths, and to schedule particular ones of the IO operations for delivery to the storage array 105 over particular ones of the paths based at least in part on the measured payload size per operation metrics. In embodiments of this type, the paths having relatively high payload size per operation metrics are given priority in the scheduling over paths having relatively low payload size per operation metrics.

A given one of the payload size per operation metrics is illustratively computed as a function of a number of IO operations previously scheduled for the path and a number of blocks corresponding to the previously-scheduled IO operations wherein the numbers are determined from respective first and second counters implemented in the MPIO driver. The blocks may comprise the above-noted 512-byte SCSI blocks or other types of blocks. In some embodiments, the given payload size per operation metric comprises an average payload size per operation for the path computed as the number of blocks divided by the number of previously-scheduled IO operations.

The above-noted second counter utilized to determine the number of blocks corresponding to the previously-scheduled IO operations illustratively comprises a payload size counter configured to track outstanding command payload for a corresponding one of a plurality of paths from the host device 102-1 to the storage array 105. Multiple such payload size counters are maintained by the MPIO driver 112-1 for respective ones of the paths. A given such payload size counter can be configured, for example, to count 512-byte SCSI blocks or other types of blocks associated with in-process commands of its corresponding path.

The term "payload size counter" as used herein is intended to be broadly construed, so as to encompass, for example, any updatable data structure or other value-storing mechanism implemented in the host device 102-1 that can, through incrementing and decrementing operations applied to that mechanism, maintain information indicating an amount of payload associated with in-process commands issued on a corresponding path. A wide variety of different payload size counter types can therefore be used. The amount of payload associated with in-process commands issued on a particular path is an example of what is also referred to herein as "outstanding command payload" for that path. An in-process command is illustratively a command that has been sent by the host device 102-1 to the storage array 105 but has not yet completed from the viewpoint of the host device 102-1.

A given one of the payload size per operation metrics is illustratively determined by dividing a current value of the above-noted second counter, illustratively comprising a payload size counter of the type described above, by the number of operations reflected in a current value of the above-noted first counter. Other payload size per operation metrics can be determined using other counter arrangements.

The scheduling performed by the MPIO driver 112-1 in illustrative embodiments can be based at least in part on the measured latencies for the respective paths in combination with the measured latencies of respective ones of a plurality of storage volumes of the storage array 105, and/or the measured payload size per operation metrics for each of at least a subset of the plurality of paths. For example, a scheduling algorithm or other type of algorithm implemented by the MPIO driver 112-1 for selecting IO operations from the set of IO queues 110-1 for delivery to the storage array 105 over particular ones of the paths can be adjusted to take into account the measured latencies of the respective paths, the measured latencies of the respective storage volumes, and/or the measured payload size per operation metrics for the respective paths. A given such algorithm can incorporate both scheduling and load balancing functionality, as well as other selection criteria.

As indicated previously, conventional multi-path scheduling approaches fail to take into account various behavioral characteristics of the multiple paths, often because it is difficult to identify adverse instances of such characteristics for particular paths. For example, performance issues that are particularly difficult to detect under conventional practice include "slow drain" issues potentially arising from imbalances in supported data rates between host devices, network switches and storage arrays. Hardware problems and noisy communication lines can also lead to path performance issues that are very difficult to detect. These and other behavioral characteristics that are commonly neglected in conventional multi-path scheduling can have significant negative consequences, including an inability to send or received desired payload, storage array response time spikes due to command completion delays, and substantial degradations in application performance.

Such drawbacks are advantageously overcome in illustrative embodiments herein by utilization of a multi-path layer comprising one or more of the MPIO drivers 112 to perform scheduling based at least in part on measured parameters such as measured latencies of respective paths, measured latencies of respective storage volumes and/or measured payload size per operation metrics for respective paths, as described above.

Unlike conventional scheduling algorithms which utilize round-robin selection or other types of selection not based on measured parameters, illustrative embodiments perform scheduling in a manner that takes into account actual behavioral characteristics of individual paths and possibly also associated storage volumes.

For example, some embodiments combine consideration of measured path latencies with measured payload size per operation metrics in the scheduling algorithm. These embodiments can achieve significantly improved throughput performance by giving priority in the selection algorithm to those paths that have relatively large payload size per operation metrics. Such arrangements recognize that commands with higher payload sizes are more efficiently executed than commands with smaller payload sizes. More particularly, for a given total payload size, a smaller number of commands with larger payload sizes is generally executed more efficiently than a larger number of commands with smaller payload sizes, in that the same payload throughput is achieved with less command overhead.

Accordingly, illustrative embodiments are configured such that for a given total payload size, it is preferable to have fewer IO operations carry that payload. For example, 16 separate 4K block IO operations will take longer to complete than a single 64K block IO operation. Given two paths having similar total command payload, it is therefore better to schedule the next command or set of commands on the path that has the smaller number of commands making up its total command payload. Such considerations are reflected through use of the above-described payload size per operation metrics that are measured for respective paths by the MPIO driver 112-1 and taken into account in the scheduling algorithm.

These and other embodiments can additionally or alternatively take into account measured latencies of storage volumes of the storage array. Different embodiments can thus configure a scheduling algorithm to utilize different arrangements of one or more of measured latencies of respective paths, measured latencies of respective storage volumes and measured payload size per operation metrics of respective paths.

A given such scheduling algorithm illustratively determines which of a plurality of paths to the storage array will be used to send the one or more commands of a particular IO operation. Such scheduling in some cases involves selecting the particular IO operation for delivery over the particular path utilizing the set of IO queues 110-1. For example, the particular IO operation may be selected from an application process queue for placement into a queue associated with the particular path. Numerous other queuing arrangements can be used in other embodiments. The set of IO queues 110-1 may therefore comprise multiple distinct sets of queues of different types, such as process queues and path queues.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The host device 102-1 may be configured to generate one or more notifications for delivery to a host administrator responsive to measured latencies of respective paths, measured latencies of respective storage volumes and/or measured payload size per operation metrics for respective paths falling outside of respective designated ranges established for those parameters. Additionally or alternatively, the host device 102-1 may be configured to generate one or more similar notifications for delivery to the storage array 105. Other types of reporting arrangements are utilized in other embodiments.

The above-described functionality of the MPIO driver 112-1 for scheduling based at least in part on measured parameters is implemented at least in part under the control of its scheduling logic 114-1. For example, the scheduling logic 114-1 is illustratively configured to control performance of the steps of the flow diagram to be described below in conjunction with FIG. 2.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105 and the MPIO drivers 112 of such other host devices are each similarly configured to select IO operations from its corresponding one of the sets of IO queues 110 for delivery to the storage array 105 over the SAN 104, and to perform the disclosed functionality for scheduling based at least in part on measured parameters. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support scheduling based at least in part on measured parameters.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of scheduling logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 214, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

The steps of the FIG. 2 process are illustratively performed primarily by or under the control of an MPIO driver of a given host device. For example, the process may be carried out under the control of software, firmware and/or hardware of an instance of scheduling logic deployed within the MPIO driver. Other arrangements of system components can be configured to perform at least portions of one or more of the steps in other embodiments. This embodiment further assumes that the commands utilized by the host devices in generating IO operations such as read and write operations directed to the storage array comprise SCSI commands, although other types of commands can be used.

In step 200, the MPIO driver in the host device measures latencies of respective paths from the host device to the storage array.

At least some of the paths from the host device to the storage array may be determined using an initial path discovery scan performed in conjunction with booting of the host device. It is assumed for the description of this embodiment that the host device has discovered a plurality of paths to the storage array, and further that at least one storage device of the storage array is visible to the host device on each of the paths.

The path discovery scan can be repeated responsive to one or more detected path changes or under other specified conditions. For example, a storage administrator or other user may perform zoning and/or masking changes to the storage array that result in at least one new path becoming available to the host device. Accordingly, the set of multiple paths for which latencies are measured in step 200 can change over time.

In step 202, the MPIO driver measures latencies of respective storage volumes of the storage array. Like the set of multiple paths for which latencies are measured in step 200, the set of storage volumes for which latencies are measured in step 202 can also change over time.

In step 204, the MPIO driver measures payload size per operation metrics for at least a subset of the paths. For example, the MPIO driver can count the number of 512-byte SCSI blocks in a queue for a given path, and divide by the number of commands associated with those blocks, in order to obtain the payload size per operation metric for that path. Each IO operation may comprise one or more commands. The resulting metric recognizes that for a given total payload size, more efficient processing is achieved for a smaller number of commands with larger payload sizes than for a larger number of commands with smaller payload sizes, due at least in part to command processing overhead. In some implementations of step 204, the payload size per operation metrics are determined for only a subset of the paths, such as the n paths having the lowest total payload sizes. A suitable value of n that may be used is n=3, although other values can used in other embodiments.

In step 206, the MPIO driver schedules particular IO operations for delivery to the storage array over particular ones of the paths based at least in part on the measured latencies of the paths, the measured latencies of the storage volumes and/or the payload size per operation metrics. For example, the MPIO driver can take into account measured latencies for respective paths, measured latencies for respective storage volumes, and measured payload size per operation metrics by scheduling IO operations to particular paths with a preference given to those paths having relatively low measured latencies and/or relatively high payload size per operation metrics. In addition, IO operations directed to storage volumes with relatively high latencies are generally scheduled to paths having relatively high latencies and/or relatively low payload size per operation metrics. Other types of scheduling arrangements taking these measured parameters into account can be used.

In step 208, transmission of the particular IO operations over the particular paths proceeds in accordance with the schedule. For example, IO operations can be selected from application process queues for insertion into path queues associated with respective paths. Other types of queuing arrangements can be used in carrying out a given schedule for delivery of particular IO operations over particular paths in other embodiments.

In step 210, a determination is made by the MPIO driver as to whether or not there are one or more additional IO operations waiting to be scheduled. If there is not at least one IO operation waiting to be scheduled, the process moves to step 212, and otherwise moves to step 214 as indicated.

In step 212, the MPIO driver awaits at least one additional IO operation to schedule, and responsive to arrival of an additional IO operation or under other specified conditions, the process advances to step 214.

In step 214, a determination is made by the MPIO driver as to whether or not the next parameter measurement interval has started. If the next parameter measurement interval has not started, the process returns to step 206 to schedule additional IO operations for transmission to the storage array. Otherwise, the process returns as indicated to repeat at least one of steps 200, 202 and 204 for the next parameter measurement interval. There may be a single parameter measurement interval for all of the parameters measured in steps 200, 202 and 204. Alternatively, distinct measurement intervals may be used for the parameters measured in each of the steps 200, 202 and 204. In an arrangement of the latter type, returns from step 214 can be to different ones of steps 200, 202 and 204 depending upon which parameters have advanced to their next measurement interval.

Multiple additional instances of the FIG. 2 process may be performed in respective additional host devices that share the storage array.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and scheduling functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different scheduling arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

As mentioned previously, different instances of the above-described process can be performed by different MPIO drivers in different host devices.

The particular scheduling arrangements described above are presented by way of illustrative example only. Numerous alternative arrangements of these and other features can be used in implementing the FIG. 2 process and other illustrative embodiments. For example, some embodiments can utilize different combinations of measured parameters than those described in conjunction with FIG. 2.

The illustrative embodiments disclosed herein can provide a number of significant advantages relative to conventional arrangements. For example, some embodiments configure a multi-path layer of one or more host devices to include functionality for scheduling based at least in part on measured parameters.

The multi-path layer in such arrangements can be configured to utilize measured path latencies, measured storage volume latencies and/or measured payload size per operation metrics in a scheduling algorithm.

Such embodiments advantageously provide improved performance by scheduling IO operations for delivery in a manner that takes into account difficult-to-detect performance issues and other actual measured behavioral characteristics of the paths, storage volumes and IO operations.

These and other arrangements are advantageously configured to provide efficient scheduling even in the presence of substantial path changes such as those that may result when paths are added or deleted as a result of zoning and masking changes or other types of storage system reconfigurations performed by a storage administrator or other user.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of scheduling logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, detection logic and additional or alternative components. Also, the particular configurations of system and device elements and associated processing operations illustratively shown in the drawings can be varied in other embodiments. For example, a wide variety of different MPIO driver configurations and associated scheduling arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   a host device comprising a processor coupled to a memory;
   the host device being configured to communicate over a network with a storage system comprising a plurality of storage devices;
   the host device further comprising:
   a multi-path input-output driver configured to schedule input-output operations for delivery to the storage system over the network;
   wherein the multi-path input-output driver is further configured:

to measure first latencies of respective ones of a plurality of paths from the host device to the storage system;

to measure second latencies of respective ones of a plurality of storage volumes of the storage system;

to schedule particular ones of the input-output operations for delivery to the storage system over particular ones of the paths based at least in part on the first and second measured latencies; and to control transmission of the particular input-output operations over the particular paths in accordance with the scheduling;

wherein in scheduling particular ones of the input-output operations for delivery to the storage system, the multi-path input-output driver is configured:

to determine one or more of the plurality of storage volumes and one or more of the plurality of paths having relatively high latencies; and to schedule particular ones of the input-output operations that are directed to the one or more of the plurality of storage volumes having the relatively high latencies for delivery to the storage system over the one or more of the plurality of paths also having the relatively high latencies.

2. The apparatus of claim 1 further comprising one or more additional host devices each configured to communicate over the network with the storage system and wherein each additional host device comprises a multi-path input-output driver configured to schedule input-output operations for delivery to the storage system over the network.

3. The apparatus of claim 1 wherein the plurality of paths comprise paths associated with respective initiator-target pairs wherein each of the initiators comprises a corresponding host bus adaptor of the host device and each of the targets comprises a corresponding port of at least one storage array of the storage system.

4. The apparatus of claim 1 wherein the multi-path input-output driver is further configured:

to send a predetermined command to the storage system over each of the plurality of paths from the host device to the storage system;

to monitor a response time for the predetermined command on each of the paths; and to determine the first latencies of the respective paths based at least in part on the monitored response times.

5. The apparatus of claim 4 wherein the predetermined command comprises a particular type of command selected to elicit a substantially immediate response from the storage system such that the monitored response time is primarily comprised of path delay rather than storage system delay.

6. The apparatus of claim 4 wherein the predetermined command comprises a vendor unique command in an otherwise standardized command format.

7. The apparatus of claim 4 wherein the predetermined command comprises a command to access a particular storage volume that is known by the host device not to exist within the storage system.

8. The apparatus of claim 1 wherein the one or more of the plurality of storage volumes having relatively high latencies comprise one or more storage volumes that are subject to at least one of a synchronous replication process, a snapshot generation process and a storage volume reconstruction process.

9. The apparatus of claim 1 wherein the multi-path input-output driver is further configured:

to measure payload size per operation metrics for each of at least a subset of the plurality of paths; and to schedule particular ones of the input-output operations for delivery to the storage system over particular ones of the paths based at least in part on the measured payload size per operation metrics.

10. The apparatus of claim 9 wherein paths having relatively high payload size per operation metrics are given priority in the scheduling over paths having relatively low payload size per operation metrics.

11. The apparatus of claim 9 wherein a given one of the payload size per operation metrics is computed as a function of a number of input-output operations previously scheduled for a path of the subset of the plurality of paths and a number of blocks corresponding to the previously-scheduled input-output operations wherein the numbers are determined from respective first and second counters implemented in the multi-path input-output driver.

12. The apparatus of claim 11 wherein the given payload size per operation metric comprises an average payload size per operation for the path computed as the number of blocks divided by the number of previously-scheduled input-output operations.

13. The apparatus of claim 1 wherein the scheduling of particular ones of the input-output operations for delivery to the storage system over particular ones of the paths is based at least in part on the measured first and second latencies in combination with measured payload size per operation metrics for each of at least a subset of the plurality of paths.

14. A method comprising:

configuring a multi-path input-output driver of a host device comprising a processor coupled to a memory to schedule input-output operations for delivery to a storage system over a network;

the multi-path input-output driver:

measuring first latencies of respective ones of a plurality of paths from the host device to the storage system;

measuring second latencies of respective ones of a plurality of storage volumes of the storage system;

scheduling particular ones of the input-output operations for delivery to the storage system over particular ones of the paths based at least in part on the measured latencies; and controlling transmission of the particular input-output operations over the particular paths in accordance with the scheduling;

wherein scheduling particular ones of the input-output operations for delivery to the storage system comprises the multi-path input-output driver:

determining one or more of the plurality of storage volumes and one or more of the plurality of paths having relatively high latencies; and scheduling particular ones of the input-output operations that are directed to the one or more of the plurality of storage volumes having the relatively high latencies for delivery to the storage system over the one or more of the plurality of paths also having the relatively high latencies.

15. The method of claim 14 further comprising the multi-path input-output driver:

measuring payload size per operation metrics for each of the plurality of paths; and scheduling particular ones of the input-output operations for delivery to the storage system over particular ones of the paths based at least in part on the measured payload size per operation metrics.

16. A computer program product comprising a non-transitory processor-readable storage medium having stored therein program code of one or more software programs, wherein the program code, when executed by a host device comprising a multi-path input-output driver, the host device being configured to communicate over a network with a storage system, causes the multi-path input-output driver:

to measure first latencies of respective ones of a plurality of paths from the host device to the storage system;

to measure second latencies of respective ones of a plurality of storage volumes of the storage system;

to schedule particular ones of the input-output operations for delivery to the storage system over particular ones of the paths based at least in part on the measured latencies; and to control transmission of the particular input-output operations over the particular paths in accordance with the scheduling;

wherein in scheduling particular ones of the input-output operations for delivery to the storage system, the program code causes the multi-path input-output driver:

to determine one or more of the plurality of storage volumes and one or more of the plurality of paths having relatively high latencies; and to schedule particular ones of the input-output operations that are directed to the one or more of the plurality of storage volumes having the relatively high latencies for delivery to the storage system over the one or more of the plurality of paths also having the relatively high latencies.

17. The computer program product of claim 16 wherein the program code when executed further causes the multi-path input-output driver:

to measure payload size per operation metrics for each of the plurality of paths; and to schedule particular ones of the input-output operations for delivery to the storage system over particular ones of the paths based at least in part on the measured payload size per operation metrics.

18. The computer program product of claim 17 wherein paths having relatively high payload size per operation metrics are given priority in the scheduling over paths having relatively low payload size per operation metrics.

19. The computer program product of claim 18 wherein a given one of the payload size per operation metrics is computed as a function of a number of input-output operations previously scheduled for a path of the subset of the plurality of paths and a number of blocks corresponding to the previously-scheduled input-output operations wherein the numbers are determined from respective first and second counters implemented in the multi-path input-output driver.

20. The computer program product of claim 16 wherein the scheduling of particular ones of the input-output operations for delivery to the storage system over particular ones of the paths is based at least in part on the measured first and second latencies in combination with measured payload size per operation metrics for each of at least a subset of the plurality of paths.

* * * * *